(12) United States Patent
Otto (10) Patent No.: US 9,776,540 B2
(45) Date of Patent: Oct. 3, 2017

(54) BEARING WITH SLIDING RADIAL COMPONENTS

(71) Applicant: SAINT-GOBAIN PERFORMANCE PLASTICS PAMPUS GMBH, Willich (DE)

(72) Inventor: Oliver Otto, Kelmis (BE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 14/974,686

(22) Filed: Dec. 18, 2015

(65) Prior Publication Data

US 2016/0176324 A1     Jun. 23, 2016

Related U.S. Application Data (60) Provisional application No. 62/094,462, filed on Dec. 19, 2014.

(51) Int. Cl.
| | |
|---|---|
| A47C 7/36 | (2006.01) |
| A47C 7/38 | (2006.01) |
| B60N 2/48 | (2006.01) |
| F16C 33/20 | (2006.01) |
| F16C 29/02 | (2006.01) |

(Continued)

(52) U.S. Cl.
CPC ............ B60N 2/4808 (2013.01); F16C 29/02 (2013.01); F16C 33/046 (2013.01); F16C 33/20 (2013.01); F16C 33/201 (2013.01); F16C 33/205 (2013.01); F16C 33/208 (2013.01); F16C 33/26 (2013.01); B60N 2002/4897 (2013.01); F16C 2326/08 (2013.01)

(58) Field of Classification Search
CPC ..................... B60N 2/4808; B60N 2002/4897
USPC ................................................. 297/391, 410
See application file for complete search history.

(56) References Cited

U.S. PATENT DOCUMENTS

| | | | | |
|---|---|---|---|---|
| 4,976,493 A | * | 12/1990 | Frankila ............... | B60N 2/4817 297/410 X |
| 5,080,437 A | * | 1/1992 | Pesta .................... | B60N 2/4817 297/410 X |

(Continued)

FOREIGN PATENT DOCUMENTS

| | | |
|---|---|---|
| DE | 19845949 A1 | 4/2000 |
| EP | 0254307 A1 | 1/1988 |

(Continued)

OTHER PUBLICATIONS

International Search Report for PCT/EP2015/080473 mailed on Apr. 12, 2016, 2 pages.

*Primary Examiner* — Rodney B White
(74) *Attorney, Agent, or Firm* — Chi S. Kim; Abel Law Group, LLP (57) ABSTRACT

A bearing including an annular substrate defining a first and a second opposite axial ends; and a plurality of sliding components attached to and extending radially from the annular substrate, each sliding component extending at least partially between the first and second opposite axial ends of the annular substrate. A head restraint assembly including a head restraint having a body and a first and second post extending from the body; a first guide sleeve having a first bearing for receiving the first post; and a second guide sleeve having a second bearing for receiving the second post.

14 Claims, 3 Drawing Sheets

(51) Int. Cl.
*F16C 33/04* (2006.01)
*F16C 33/26* (2006.01)

(56) References Cited

U.S. PATENT DOCUMENTS

| | | | |
|---|---|---|---|
| 5,180,207 A * | 1/1993 | Schmidt | B60N 2/485 297/410 X |
| 5,372,430 A | 12/1994 | Orndorff, Jr. et al. | |
| 5,788,250 A * | 8/1998 | Masters | B60N 2/4826 297/391 |
| 5,816,658 A * | 10/1998 | Wallis | B60N 2/4814 297/391 |
| 7,491,353 B2 | 2/2009 | Kim et al. | |
| 7,695,194 B2 | 4/2010 | Bouru | |
| 8,021,051 B2 | 9/2011 | James | |
| 2002/0051586 A1 | 5/2002 | Orndorff, Jr. et al. | |
| 2002/0157235 A1 * | 10/2002 | Napolitano, Jr. | B21D 39/02 297/410 X |
| 2003/0151290 A1 * | 8/2003 | Gans | B60N 2/4814 297/410 |
| 2006/0250017 A1 * | 11/2006 | Otto | B60N 2/4864 297/410 |
| 2012/0168061 A1 | 7/2012 | Lien et al. | |
| 2012/0200135 A1 * | 8/2012 | Muto | B60N 2/4823 297/410 |
| 2013/0206930 A1 | 8/2013 | Gottwald et al. | |
| 2015/0001907 A1 * | 1/2015 | Hagan | B60N 2/4814 297/410 |
| 2015/0001908 A1 * | 1/2015 | Hagan | B60N 2/4814 297/410 |
| 2015/0028644 A1 * | 1/2015 | Hagan | B60N 2/4817 297/410 |

FOREIGN PATENT DOCUMENTS

| | | |
|---|---|---|
| EP | 1535795 A1 | 6/2005 |
| EP | 2010058306 A1 | 5/2010 |
| FR | 2157566 A5 | 6/1973 |

* cited by examiner

BEARING WITH SLIDING RADIAL COMPONENTS

CROSS-REFERENCE TO RELATED APPLICATION(S)

This application claims priority under 35 U.S.C. §119(e) to U.S. patent application Ser. No. 62/094,462 entitled "BEARING," by Oliver Otto, filed Dec. 19, 2014, which is assigned to the current assignee hereof and incorporated herein by reference in its entirety.

FIELD OF THE DISCLOSURE

The present disclosure is directed to a bearing.

RELATED ART

Bearings provide low friction slip interfaces between components. At a most basic level, a bearing can include a low friction material interfacing between two components which are movable with respect to one another. The bearing can include a material which lowers the coefficient of friction between the two components, thus facilitating easier movement therebetween.

Seat head restraints traditionally include a cushion and two posts. The posts extend into a seatback. A bearing can be disposed between the seatback and the posts to facilitate translation therebetween.

The industry continues to demand a head restraint bearing capable of providing sufficient rigidity and a suitable low friction slip interface while simultaneously having a cost effective design.

BRIEF DESCRIPTION OF THE DRAWINGS

Embodiments are illustrated by way of example and are not intended to be limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and head restraint arts.

A bearing in accordance with one or more of the embodiments described herein can generally include an annular substrate and a sliding component disposed radially inside or outside of the annular substrate. The sliding component may include at least two discrete segments. As used herein, "discrete segments" refer to distinct segments or components. "Discrete segments" may be disconnected or discontinuous so as to be detached from one another. In an embodiment, the sliding component includes at least three discrete segments, such as at least four discrete segments, at least five discrete segments, or even at least ten discrete segments. The discrete segments may each be spaced apart from one another, i.e., the discrete segments do not contact or overlap. In this regard, the inner surface of the bearing may include a surface area that is greater than a contact area of the sliding component therein. This may reduce the overall cost of the bearing and minimize the use of unnecessary materials.

A method of forming a bearing in accordance with one or more of the embodiments described herein can generally include shaping a plurality of sliding components, aligning the sliding components in circumferential alignment, and shaping a material to the sliding components, the material forming a generally annular body or substrate supporting the sliding components.

Figure 1:
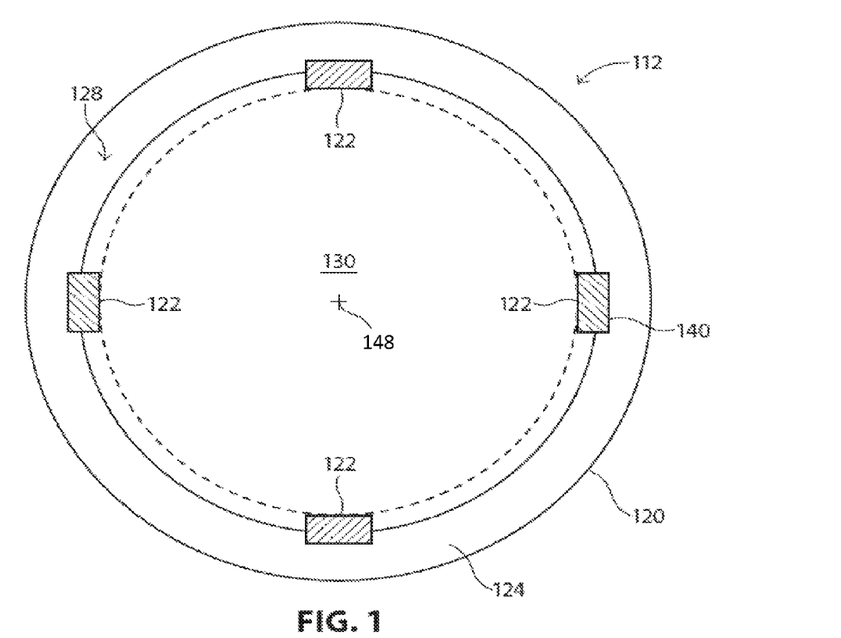
FIG. 1 includes a top elevation view of a bearing in accordance with an embodiment.

FIG. 1 illustrates a top view of a bearing 112 in accordance with an embodiment. The bearing 112 may generally include a first component 120 and a second component 122. The second component 122 may be coupled to the first component 120.

In an embodiment, the first component 120 can have a body 124 defining first and second opposite axial ends 126 (FIG. 6) and 128, and a lumen 130 extending therebetween. In a particular embodiment, the body 124 may be generally cylindrical. In another embodiment, the body 124 may be cuboidal or otherwise non-cylindrical. In yet a further embodiment, the body 124 may have an ovular cross-sectional profile. In a further embodiment, the body 124 may have a non-uniform profile. For example, the body 124 can have a first cross-sectional profile at a first location and a second cross-sectional profile at a second location, the first and second cross-sectional profiles being different from one another.

In an embodiment, the second component 122 can extend radially inward from the first component 120 into the lumen 130. In another embodiment, the second component 122 can extend radially outward from the first component 120.

The bearing 112 can include a plurality of second components 122. For example, the bearing 112 can include at least three second components 122, such as at least four second components 122, at least five second components 122, at least ten second components, or even at least twenty-five second components 122. In an embodiment, the second components 122 are equally spaced apart around a circumference of the bearing 112.

In a particular embodiment, at least two of the second components 122 may have the same size, shape, construction, or material selection as compared to one another. In a further embodiment, all of the second components 122 may have the same size, shape, construction, or material selection as compared to one another. This may permit a uniform force profile around the circumference of the bearing 112. That is, all of the second components 122 may provide substantially equal radial forces as compared to one another. Skilled artisans will recognize that such uniformity between the second components 122 is not required. For particular applications it may be desirable for at least two of the second components 122 to differ in size, shape, construction, or material selection as compared to one another. For example, for inner components having non-circular cross-sectional profiles, it may be necessary to use second components of varying geometry, size, construction, or material selection.

In an embodiment, at least one of the second components 122 may include a tapered axial end (not illustrated). The tapered axial end may assist to facilitate alignment of an inner or outer component, such as a shaft or post, with the bearing 112. In a further embodiment, all of the second components 122 may include tapered axial ends. In a particular embodiment, the tapered axial ends may be disposed at the axial end of the bearing where the inner or outer component first makes contact with the second component. In yet another embodiment, at least one of the second components may include tapered axial ends at both axial ends thereof.

In an embodiment, at least one of the second components 122 at least partially includes a polymer. Exemplary polymers include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. In accordance with a particular embodiment, at least one of the second components 122 includes a fluoropolymer.

In an embodiment, at least one of the second components 122 further includes a filler. The filler may reduce sliding resistance. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

In particular embodiments, the second components 122 can be installed in the first component 120 by translating one or both of the first or second components 120 or 122 relative to the other of the first or second components 120 or 122 along a central axis 148 of the bearing 112.

In other embodiments, the first component 120 can be overmolded to the second component 122. This may be performed by positioning the second components in a jig or other structural support and molding the first component thereover. One or more masking layers can be utilized to prevent accumulation of the first component along a contact surface of the second components. Machining can be performed to further shape the first or second components to a suitable configuration. Exemplary machining techniques include grinding, sanding, ablating, pickling, etching, cutting, drilling, and plating.

In other embodiments, the second components 122 can be overmolded to the first component 120. For example, the first component can be formed to include a central lumen. In an embodiment, cutouts can extend into the first component from the lumen. In another embodiment, the cutouts can extend into the first component from a radially outer surface of the first component. Second components can then be molded into the cutouts and allowed to cure therein.

Figure 2:
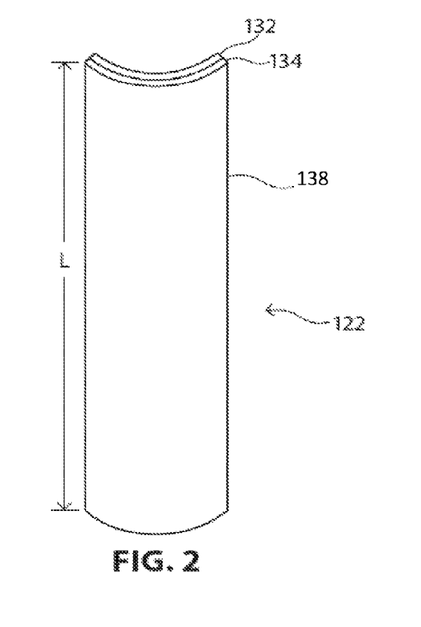
FIG. 2 includes a perspective view of a laminated sliding component in accordance with an embodiment.

Referring now to FIG. 2, at least one of the second components 122 can include a laminated structure 138. In a more particular embodiment, all of the second components 122 can include a laminated structure 138. The laminated structure 138 can include a substrate 132 and a low friction layer 134. The low friction layer 134 and substrate 132 of each of the laminated structures 138 at least partially overlap one another. More particularly, the low friction layer 134 may fully overlap the substrate 132, such that at least one major surface of the substrate 132 is coupled to the low friction layer 134.

In an embodiment, the low friction layer 134 includes at least one of the polymeric materials described above, such as for example, PTFE or FEP. The substrate 132 may include a resilient material, such as a metal, an alloy, a ceramic, or a rigid polymer. Exemplary polymers include PA, PE, PET, PBT, or any combination thereof.

In an embodiment, the laminated structure 138 can include discrete sheets coupled together. In this regard, the substrate 132 and low friction layer 134 can be formed prior to engagement with one another. In an embodiment, the substrate 132 and low friction layer 134 can each be disposed in a roll and peeled therefrom to join together under pressure, at elevated temperatures, by an adhesive, or by any combination thereof.

In other embodiments, the low friction layer 134 may be applied to the substrate 132 by a coating technique, such as, for example, physical or vapor deposition, spraying, plating, powder coating, or through other chemical or electrochemical techniques. In a particular embodiment, the low friction layer 134 may be applied by a roll-to-roll coating process, including for example, extrusion coating. The low friction layer 134 may be heated to a molten or semi-molten state and extruded through a slot die onto a major surface of the substrate 132. In another embodiment, the low friction layer 134 may be cast or molded.

In an embodiment, the low friction layer 134 may be pressed or rolled to the substrate 132. In a particular embodiment, pressing or rolling can occur at elevated temperatures, i.e., the low friction layer 134 is hot-pressed or rolled.

In some embodiments, an adhesive layer (not illustrated) may be disposed between the low friction layer 134 and the substrate 132. The adhesive layer may comprise a hot melt adhesive. Examples of adhesives that can be used include fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C.

In an embodiment, one or more corrosion resistant coatings (not illustrated) can be applied to the substrate 132. The corrosion resistant coating can have a thickness in a range of 1 to 50 microns, such as in a range of 5 to 20 microns, or even in a range of 7 to 15 microns. The corrosion resistant coating can include an adhesion promoter layer and an epoxy layer.

In an embodiment, an epoxy layer can increase the corrosion resistance of the substrate 132. For example, epoxy layer can substantially prevent corrosive elements, such as water, salts, and the like, from contacting the substrate 132, thereby inhibiting chemical corrosion thereof.

During lamination, the laminated structures 138 may have a planar configuration. After lamination, at least one of the laminated structures 138 may be shaped to a non-planar configuration. For example, the laminated structure 138 may have an arcuate profile as viewed along the length, L, of the laminated structure 138. Alternatively, the laminated structure 138 may have a polygonal profile as viewed along the length. Exemplary polygonal profiles include: a triangle, a quadrilateral, a pentagon, a hexagon, a heptagon, an octagon, a nonagon, or even a decagon. Additional shapes are contemplated herein and generally include polygons or ellipsoids, alone or in combination.

Figure 3:
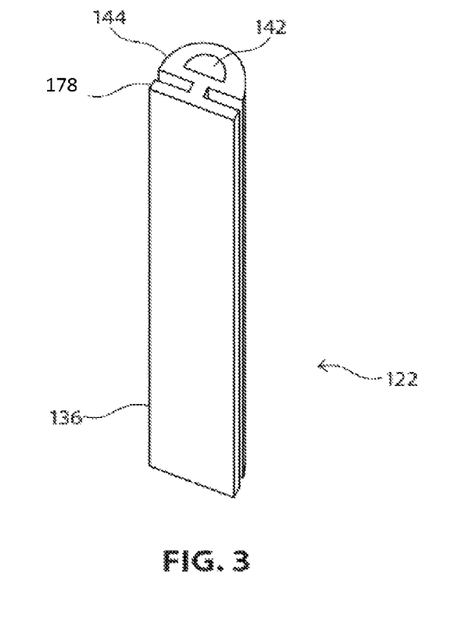
FIG. 3 includes a perspective view of a low friction bar in accordance with an embodiment.

Referring now to FIG. 3, in an embodiment, at least one of the second components 122 of the bearing 112 may include a low friction bar 136 having a portion engageable with the first component 120 and a portion that extends radially into the lumen 130. In a more particular embodiment, all of the second components 122 of the bearing 112 may include low friction bars 136.

At least one of the low friction bars 136 may have a unitary construction, i.e., the low friction bar 136 is monolithic. In an embodiment, all of the low friction bars 136 may have unitary constructions.

In an embodiment, at least one of the low friction bars 136 can include a body having an engagement component 178 adapted to engage with a cutout 140 (FIG. 1) of the first component 120. The engagement component 178 may secure the low friction bar 136 to the first component 120. In a particular embodiment, the engagement component 178 may form an interference fit with the cutout 140. In an embodiment, the engagement component 178 may be oversized by at least 1% relative to a volume of the cutout 140, such as by at least 2% relative to the volume of the cutout 140, by at least 5% relative to the volume of the cutout 140, or even by at least 10% relative to the volume of the cutout 140. In a particular embodiment, the engagement component 178 may be oversized by no more than 200% relative to the volume of the cutout 140.

Securing engagement component 178 within the cutout 140 can be performed by several techniques. For example, the engagement component 178 can include a shape that is generally complementary to the shape of the cutout 140. In another embodiment, the engagement component 178 can be secured within the cutout 140 by an adhesive, mechanical fastener, or any combination thereof.

In a particular embodiment, at least one of the low friction bars 136 further includes a substrate 142. The substrate 142 may extend at least partially along a length of the low friction bar 136. The substrate 142 may be at least partially encapsulated by a low friction layer 144 of the low friction bar 136. That is, the low friction layer 144 may cover at least a portion of the substrate 142. Axial ends of the substrate 142 may or may not be exposed from the low friction layer 144. In a particular embodiment, the substrate 142 may be fully encapsulated in the low friction layer 144 such that the substrate 142 is not visibly perceptible. Exemplary substrates include metals, polymers, ceramics, and alloys.

In another embodiment, the substrate 142 can be replaced by an aperture extending at least partially into the low friction layer 144. The aperture can generally reduce stiffness of the low friction bar 136, thereby allowing a specific engineered stiffness profile.

Figure 4:
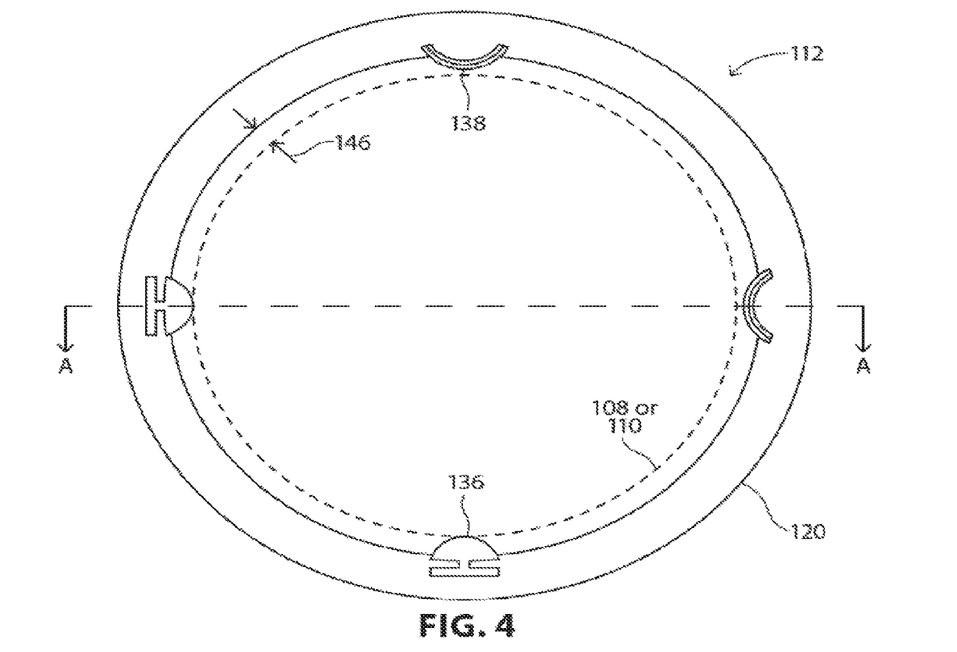
FIG. 4 includes a top elevation view of a bearing in accordance with an embodiment.

FIG. 4 illustrates a top view of an exemplary bearing 112 including both laminated structures 138 and low friction bars 136 disposed within the first component 120. Skilled artisans will recognize that bearings in accordance with embodiments disclosed herein can utilize second components of entirely laminated structures or low friction bars. In a non-illustrated embodiment, the laminated structures or low friction bars may extend radially outward from the first component. In yet another non-illustrated embodiment, some of the laminated structures or low friction bars may extend radially inward from the first component while others of the laminated structures or low friction bars may extend radially outward from the first component.

In an embodiment, the first component 120 may include a resilient material, such as a metal or a rigid polymer. In those embodiments where the first component 120 is overmolded to the second components 122, it may be desirable to utilize a polymer having suitable molding characteristics. Exemplary polymers include a polyamide (PA), a polybutylene terephthalate (PBT), a polyphenylene sulfide (PPS), ethylene tetrafluoroethylene (ETFE), a polyetherketone (PEEK), a polyester (PE), a polyethyleneimine (PEI), a polyethersulfone (PESU), a polyethylene terephthalate (PET), a polyphthalamide (PPA), a poly (p-phenylene sulfide), a polycarbonate (PC), or a combination thereof. In a particular embodiment, the first component 120 may comprise a nylon, a PBT, a PPA, or a PPS. The nylon may be, for example, nylon 6, nylon 66, nylon 610, nylon 612, nylon 66/6, nylon 410, or nylon 46.

In the case of a bearing 112 having radially inward extending laminated structures 138 or low friction bars 136, a best fit innermost circle of the bearing 112 can be formed tangent to the laminated structures 138 and low friction bars 136. In this regard, an inner component may contact the bearing 112 only at innermost contact portions of the laminated structures 138 and low friction bars 136. Thus, an effective radial gap 146 can be disposed between the inner component and the first component 120 along at least a portion, such as a majority, of the circumference of the inner component. In the case of a bearing 112 having radially outward extending laminated structures 138 or low friction bars 136, a best fit innermost circle of the bearing can be formed tangent to the laminated structures and low friction bars. In this regard, an outer component may contact the bearing only at outermost contact portions of the laminated structures and low friction bars. Thus, an effective radial gap can be disposed between the outer component and the first component along at least a portion, such as a majority, of the circumference of the outer component.

Whereas traditional plain bearings form full, or nearly full, circumferential contact with an internal component, embodiments of the present bearing 112 can have reduced area contact. Moreover, those areas of the bearing 112 having effective radial gaps 146 can be formed without costly low friction materials, thereby reducing material and manufacturing costs to make the bearing 112.

The laminated structures 138 or low friction bars 136 extend at least partially between the first and second opposite axial ends 126 and 128 of the first component 120. In a particular embodiment, at least one of the laminated structures 138 or low friction bars 136 may extend along at least 20% of the axial length of the first component 120, such as at least 30% of the axial length of the first component 120, at least 40% of the axial length of the first component 120, at least 50% of the axial length of the first component 120, at least 60% of the axial length of the first component 120, at least 70% of the axial length of the first component 120, at least 80% of the axial length of the first component 120, or even at least 90% of the axial length of the first component 120. In a more particular embodiment, at least one of the laminated structures 138 or low friction bars 136 may extend along no greater than 100% of the axial length of the first component 120, such as along no greater than 99% of the axial length of the first component 120, along no greater than 98% of the axial length of the first component 120, along no greater than 97% of the axial length of the first component 120, along no greater than 96% of the axial length of the first component 120, or even along no greater than 95% of the axial length of the first component 120.

Figure 5:
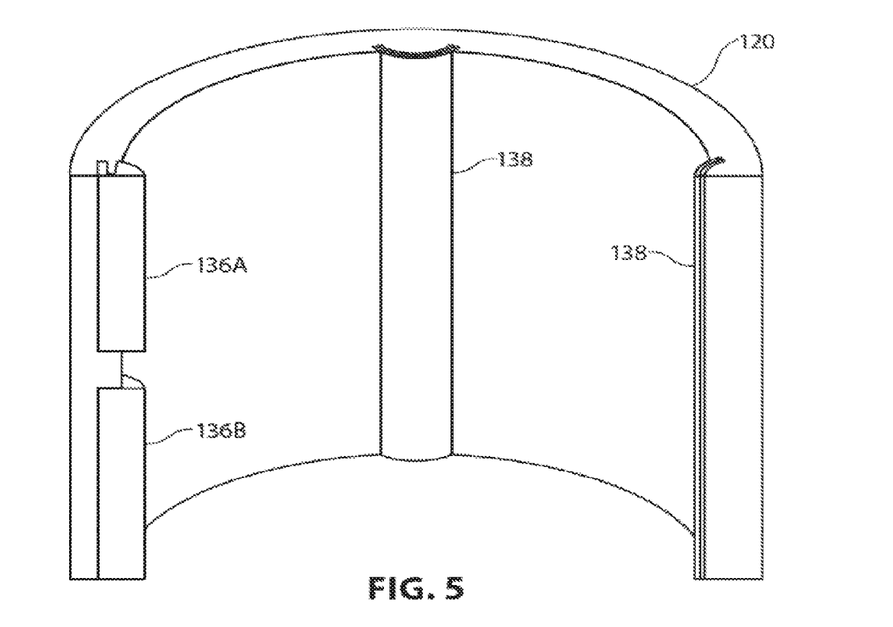
FIG. 5 includes a cross-sectional perspective view of the bearing of FIG. 4 as seen along line A-A.

As illustrated in FIG. 5, the laminated structures 138 may extend along 100% of the axial length of the first component 120 whereas the low friction bars 136A and 136B may extend along less than 100% of the axial length of the first component 120. In accordance with one or more of the embodiments described herein, a single column of second components can include a plurality of second components. For example, as illustrated in FIG. 5, a single axial column of second components includes two low friction bars 136A and 136B. In another embodiment, at least one of the axial columns of second components can include at least two laminated structures 138. In yet a further embodiment, at least one of the axial columns of second components can include at least one laminated structure 138 and at least one low friction bar 136. Utilization of multi-component axial columns further reduces material costs and unnecessary contact between the bearing 112 and the inner component.

In an embodiment, at least one of the second components 122 may have a uniform cross-sectional shape along at least 25% of an axial length thereof, such as along at least 30% of the axial length, along at least 35% of the axial length, along at least 40% of the axial length, along at least 45% of the axial length, along at least 50% of the axial length, along at least 55% of the axial length, along at least 60% of the axial length, along at least 65% of the axial length, along at least 70% of the axial length, along at least 75% of the axial length, or even along at least 80% of the axial length. In an embodiment, the shape of at least one of the second components 122 may be uniform along an entire axial length of the at least one second components 122. In a more particular embodiment, the shape of all of the second components 122 may be uniform along the entire axial lengths thereof. Non-uniform second components 122 may be particularly advantageous in applications having inner components with non-uniform cross sections. For example, the inner component may have both a polygonal portion and an ellipsoidal portion. Alternatively, the inner component may have different diameters at different locations therealong. Tapered or otherwise varying shapes may enhance engagement with such inner components.

Figure 6:
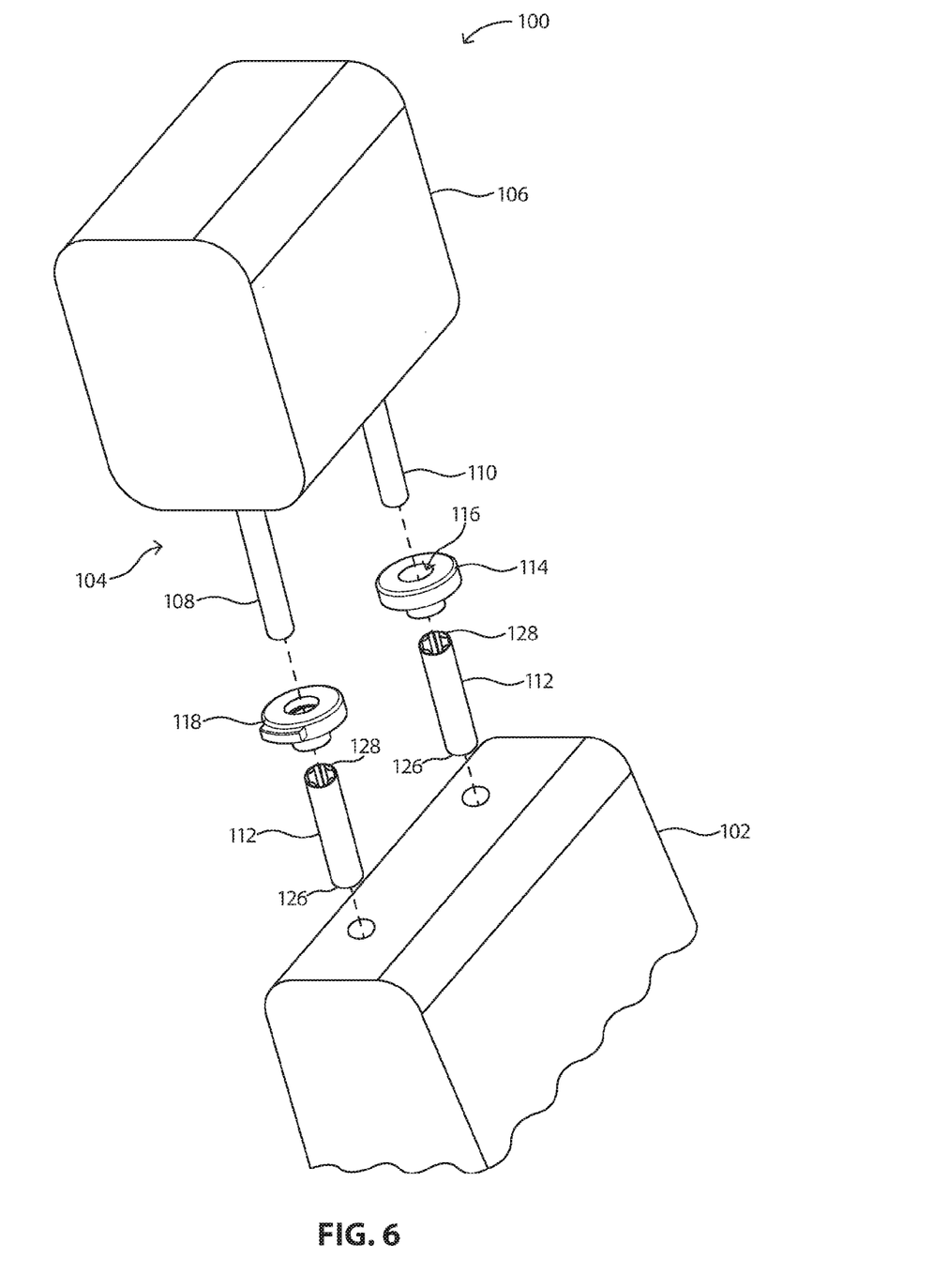
FIG. 6 includes an exploded top perspective view of a vehicle seat assembly in accordance with an embodiment.

Referring now to FIG. 6, a vehicle seat assembly 100 can generally include a seat back 102 coupled to a seat bottom (not illustrated). A head restraint assembly 104 can engage with the seat back 102 and can include a head cushion 106 and two posts 108 and 110 extending therefrom. The posts 108 and 110 can be insertable into the seat back 102 in a manner so as to allow relative movement between the head cushion 106 and the seat back 102. Specifically, the posts 108 and 110 can be adapted to longitudinally translate relative to the seat back 102, allowing the head cushion 106 to be suitably adjusted for occupants of varying size.

One or more bearings 112 can be disposed at least partially within the seat back 102 and secured therewith. In an embodiment, at least one of the bearings 112 may be coupled with the seat back 102 by at least one of a weld, an adhesive, a mechanical fastener, or any other suitable coupling arrangement. In this regard, the bearing 112 may be statically affixed to the seat back 102.

A component 114 may be coupled to an axial end of at least one of the bearings 112. The component 114 may attach to the bearing 112 and include a central aperture 116 into which the posts 108 and 110 can be inserted.

In an embodiment, the vehicle seat assembly 100 can include a second component 118 similar to the component 114. The second component 118 may include a body having a central aperture extending therethrough. The second component 118 may further include a locking mechanism adapted to selectively prevent longitudinal translation of the post 108 relative to the seat back 102. The above description of the vehicle seat assembly 100 is exemplary and not intended to limit the embodiments described herein.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A bearing comprising:
an annular substrate defining a first and a second opposite axial ends; and
a plurality of sliding components attached to and extending radially from the annular substrate, each sliding component extending at least partially between the first and second opposite axial ends of the annular substrate.

Embodiment 2

A bearing comprising:
an annular substrate; and
a sliding component disposed radially inside of the annular substrate,
wherein the sliding component comprises at least two discrete segments as viewed along a line extending circumferentially around the bearing.

Embodiment 3

A bearing comprising:
an annular substrate; and
a sliding component disposed radially outside of the annular substrate,
wherein the sliding component comprises at least two discrete segments as viewed along a line extending circumferentially around the bearing.

Embodiment 4

A bearing comprising:
a first component having a generally cylindrical body defining a first and a second opposite axial ends and a lumen extending between the first and second opposite axial ends, the first component having a plurality of cutouts extending radially outward from the lumen along at least a portion of an axial length thereof; and
a plurality of second components each disposed at least partially within one of the cutouts, the second components extending radially inward from the generally cylindrical body of the first component.

Embodiment 5

The bearing according to any one of embodiments 1-3, wherein the annular substrate defines a first component having a lumen and the sliding components each define a second component.

Embodiment 6

The bearing according to any one of embodiments 4 and 5, wherein at least one of the second components at least partially comprises a polymer.

Embodiment 7

The bearing according to any one of embodiments 4-6, wherein at least one of the second components at least partially comprises a low friction material.

Embodiment 8

The bearing according to any one of embodiments 4-7, wherein at least one of the second components at least partially comprises a fluoropolymer, such as a PTFE.

Embodiment 9

The bearing according to any one of embodiments 4-8, wherein at least one of the second components comprises a laminate structure.

Embodiment 10

The bearing according to embodiment 9, wherein the laminate structure includes a substrate and a low friction material.

Embodiment 11

The bearing according to any one of embodiments 9-10, wherein the laminate structure lies along a plane.

Embodiment 12

The bearing according to any one of embodiments 9-11, wherein the laminate structure is arcuate.

Embodiment 13

The bearing according to embodiment 12, wherein the laminate structure is arcuate along an entire axial length of the second component.

Embodiment 14

The bearing according to any one of embodiments 9-13, wherein the laminate structure forms a first and a second opposite circumferential ends and a middle section disposed between the first and second opposite circumferential ends, and wherein the first and second opposite circumferential ends are disposed radially outside of the middle section.

Embodiment 15

The bearing according to any one of embodiments 4-14, wherein at least one of the second components comprises a low friction bar.

Embodiment 16

The bearing according to embodiment 15, wherein each low friction bar comprises a unitary construction.

Embodiment 17

The bearing according to embodiment 15, wherein each low friction bar comprises a substrate and a low friction material.

Embodiment 18

The bearing according to any one of embodiments 10-17, wherein the substrate includes a resilient material, such as a metal or a polymer.

Embodiment 19

The bearing according to any one of embodiments 10-18, wherein the low friction material comprises a low friction material, such as a polymer, such as a fluoropolymer, such as a PTFE.

Embodiment 20

The bearing according to any one of embodiments 4-19, wherein the second component is removable from the first component.

Embodiment 21

The bearing according to any one of embodiments 4-20, wherein at least one of the second components is visible along at least one axial ends of the first component.

Embodiment 22

The bearing according to any one of embodiments 4-21, wherein all of the second components are visible along at least one axial end of the first component.

Embodiment 23

The bearing according to any one of embodiments 4-22, wherein at least one of the second components has at least one tapered axial end.

Embodiment 24

The bearing according to embodiment 23, wherein at least one of the second components has a first and a second opposite axial end, both axial ends including a taper.

Embodiment 25

The bearing according to any one of embodiments 23 and 24, wherein the tapered axial end forms a guide portion for insertion of an inner component into the bearing.

Embodiment 26

The bearing according to any one of embodiments 4-25, wherein each second component defines an innermost surface, and wherein the innermost surface of at least one of the second components lies along a plane.

Embodiment 27

The bearing according to any one of embodiments 4-26, wherein each second component defines an innermost face, and wherein the innermost surface of all of the second components lie along a plane.

Embodiment 28

The bearing according to any one of embodiments 4-27, wherein each second component defines an innermost surface having a length, wherein the annular member has a length, and wherein the length of the annular member is no less than the length of the second components.

Embodiment 29

The bearing according to any one of embodiments 4-28, wherein at least one of the second components further includes a lubricant.

Embodiment 30

The bearing according to embodiment 29, wherein the lubricant is embedded within the at least one second component.

Embodiment 31

The bearing according to any one of embodiments 4-30, wherein the first component comprises a resilient material.

Embodiment 32

The bearing according to any one of embodiments 4-31, wherein the first component at least partially comprises a polymer.

Embodiment 33

The bearing according to any one of embodiments 4-32, wherein the first component at least partially comprises a PA, a PBT, a PPS, an ETFE, a PEEK, a PE, a PEI, a PESU, a PET, a PPA, a poly (p-phenylene sulfide), a PC, or any combination thereof.

Embodiment 34

The bearing according to any one of embodiments 4-33, wherein the first component at least partially comprises a metal.

Embodiment 35

The bearing according to any one of embodiments 4-34, wherein the first component has a unitary construction.

Embodiment 36

The bearing according to any one of embodiments 4-35, wherein the first component is formed by injection molding.

Embodiment 37

The bearing according to any one of embodiments 4-36, wherein the second component defines a maximum radial height, wherein an exposed portion of the second component, as measured from an innermost surface of the first component, defines an exposed radial height, and wherein the exposed radial height is less than 99% the maximum radial height, such as less than 95%, less than 90%, less than 85%, less than 80%, less than 70%, less than 60%, or even less than 50%.

Embodiment 38

The bearing according to any one of embodiments 4-37, wherein, when viewed along the axial length of the lumen, the cutouts each define a first complementary engagement structure, the second components each define a second complementary engagement structure, the first and second complementary engagement structures secure the first and second components together.

Embodiment 39

The bearing according to any one of embodiments 4-38, wherein, when viewed along the axial length of the lumen, at least one of the cutouts has a generally polygonal shape.

Embodiment 40

The bearing according to any one of embodiments 4-39, wherein, when viewed along the axial length of the lumen, at least one of the cutouts has a generally trapezoidal shape.

Embodiment 41

The bearing according to any one of embodiments 4-40, wherein, when viewed along the axial length of the lumen, at least one of the cutouts has a T-Shape.

Embodiment 42

The bearing according to any one of embodiments 4-41, wherein, when viewed along the axial length of the lumen, at least one of the cutouts has a generally ellipsoidal shape.

Embodiment 43

The bearing according to any one of embodiments 4-42, wherein, when viewed along the axial length of the lumen, at least one of the cutouts has a throttled opening.

Embodiment 44

The bearing according to any one of embodiments 4-43, wherein at least one of the cutouts extends a maximum distance into the first component, and wherein the maximum distance of the cutouts is less than 95% a thickness of the first component, such as less than 90%, less than 80%, less than 70%, less than 60%, less than 50%, less than 40%, less than 30%, less than 20%, or even less than 10%.

Embodiment 45

The bearing according to any one of embodiments 4-44, wherein at least one of the cutouts extends along at least 20% of the axial length of the first component, such as at least 30%, at least 40%, at least 50%, at least 60%, at least 70%, at least 80%, or even at least 90%.

Embodiment 46

The bearing according to any one of embodiments 4-45, wherein the cutouts each extend along the entire axial length of the first component.

Embodiment 47

The bearing according to any one of embodiments 4-46, wherein the first component comprises at least two circumferentially extending rows of cutouts.

Embodiment 48

The bearing according to embodiment 47, wherein the at least two circumferentially extending rows of cutouts are circumferentially aligned such that at least one cutout in a first circumferentially extending row circumferentially aligns with a cutout in the second circumferentially extending row.

Embodiment 49

The bearing according to any one of embodiments 4-48, wherein the second components comprise a combined volume of material, $V_S$, wherein the first component comprises a volume of material, $V_F$, and wherein $V_F$ is greater than 0.1 $V_S$, greater than 0.2 $V_S$, greater than 0.3 $V_S$, greater than 0.4 $V_S$, greater than 0.5 $V_S$, greater than 0.6 $V_S$, greater than 0.7 $V_S$, greater than 0.8 $V_S$, greater than 0.9 $V_S$, greater than 1.0 $V_S$, greater than 1.5 $V_S$, greater than 2.0 $V_S$, or even greater than 5.0 $V_S$.

Embodiment 50

The bearing according to any one of embodiments 4-49, wherein an interior surface of the first component is exposed between the cutouts.

Embodiment 51

The bearing according to any one of embodiments 4-50, wherein the second components define an effective diameter, and wherein the effective diameter is less than the diameter of the lumen.

Embodiment 52

The bearing according to embodiment 51, wherein the effective diameter is no greater than 99% of the diameter of the lumen, such as no greater than 90%, no greater than 80%, no greater than 70%, no greater than 60%, or even no greater than 50%.

Embodiment 53

The bearing according to any one of embodiments 51 and 52, wherein the effective diameter is no less than 5% of the diameter of the lumen, such as no less than 10%, no less than 15%, or even no less than 20%.

Embodiment 54

The bearing according to any one of embodiments 4-53, wherein the second components each define a radial height, as measured by a distance each second component extends from the inner surface of the first component, and wherein the radial height of at least two second components is equal.

Embodiment 55

The bearing according to any one of embodiments 4-54, wherein the second components each define a radial height, as measured by a distance each second component extends from the inner surface of the first component, and wherein all of the second components have the same radial height with respect to each other.

Embodiment 56

The bearing according to any one of embodiments 4-54, wherein the second components each define a radial height, as measured by a distance each second component extends from the inner surface of the first component, and wherein the radial height of at least two of the second components is different.

Embodiment 57

The bearing according to any one of embodiments 4-56, wherein, when viewed along the axial length of the first component, the first component has an inner circumference, and wherein the second component is disposed along a portion of the inner circumference.

Embodiment 58

The bearing according to any one of embodiments 4-57, wherein, when viewed along the axial length of the first component, the total circumferential length of all the second components is less than 90% the circumferential length of the first component as measured at an innermost surface thereof, such as less than 80%, less than 70%, less than 60%, less than 50%, less than 40%, less than 30%, or even less than 20%.

Embodiment 59

The bearing according to any one of embodiments 4-58, wherein at least one of the cutouts defines an at least partially helical line along the first component.

Embodiment 60

The bearing according to any one of embodiments 4-59, wherein at least one of the cutouts defines an at least partially straight line along the first component.

Embodiment 61

The bearing according to any one of embodiments 4-60, wherein all of the cutouts extend along an at least partially straight line along the first component.

Embodiment 62

The bearing according to any one of embodiments 4-61, wherein all of the cutouts extend along a straight line along the first component.

Embodiment 63

The bearing according to any one of embodiments 4-62, wherein at least one of the cutouts is oriented parallel to a central axis of the bearing along at least one axial segment thereof.

Embodiment 64

The bearing according to any one of embodiments 4-63, wherein all of the cutouts are oriented parallel to a central axis of the bearing along at least one axial segment thereof.

Embodiment 65

The bearing according to any one of the preceding embodiments, wherein the bearing is adapted to receive and longitudinally translate relative to an inner component.

Embodiment 66

The bearing according to any one of the preceding embodiments, wherein the bearing is adapted to receive an inner component and longitudinally translate relative to the inner component upon application of a relative longitudinal force exerted on one of the bearing and the post, the relative longitudinal force being no greater than 50 N, such as no greater than 40 N, no greater than 30 N, no greater than 20 N, or even no greater than 10 N.

Embodiment 67

The bearing according to any one of the preceding embodiments, wherein the bearing is configured for use in a vehicle seat assembly.

Embodiment 68

The bearing according to any one of the preceding embodiments, wherein the bearing is configured to be disposed between a seat back and a post of a head restraint cushion.

Embodiment 69

A head restraint assembly comprising:
a head restraint comprising a body and a first and second post extending from the body;
a first guide sleeve comprising a first bearing for receiving the first post; and
a second guide sleeve comprising a second bearing for receiving the second post,
wherein at least one of the first and second guide sleeves comprises a head restraint bearing in accordance with any one of the preceding embodiments.

Embodiment 70

A method of forming a bearing comprising:
shaping a plurality of sliding components;
aligning the sliding components in circumferential alignment; and
shaping a material to the sliding components, the material forming a generally annular body.

Embodiment 71

The method according to embodiment 70, wherein shaping the material is performed such that at least a portion of the sliding components are disposed radially inside of the generally annular body.

Embodiment 72

The method according to any one of embodiments 70 and 71, wherein shaping the material is performed by injection molding.

Embodiment 73

The method according to any one of embodiments 70-72, wherein shaping the plurality of sliding components is performed by:
laminating;
extruding;
injection molding; or
a combination thereof.

Embodiment 74

The method according to any one of embodiments 71-73, wherein shaping the plurality of sliding components is performed prior to shaping the material.

Embodiment 75

The method according to any one of embodiments 70-74, wherein each sliding component defines a length and a width, and wherein aligning the sliding components is performed such that the lengths of at least two sliding components are oriented in a parallel direction.

Embodiment 76

The method according to any one of embodiments 70-75, wherein each sliding component defines a length and a width, and wherein aligning the sliding components is performed such that the length of all of the sliding components are oriented in a parallel direction.

Embodiment 77

The method according to any one of embodiments 70-76, wherein each sliding component has a length, and wherein the length of at least one sliding component is less than an axial length of the generally annular body.

Embodiment 78

The method according to any one of embodiments 70-77, wherein each sliding component has a length and wherein the length of at least one sliding component is equal to an axial length of the generally annular body.

Embodiment 79

The method according to any one of embodiments 70-78, wherein shaping the plurality of sliding components further comprises: surface treating an exposed surface of the at least one of the plurality of sliding components to form grooves, microgrooves, pickling, dimples, or other contours.

Embodiment 80

The method according to any one of embodiments 70-79, wherein the material comprises a polymer, such as a PA, a PBT, a PPS, an ETFE, a PEEK, a PE, a PEI, a PESU, a PET, a PPA, a poly (p-phenylene sulfide), a PC, or any combination thereof.

Embodiment 81

The method according to any one of embodiments 70-80, wherein at least one of the plurality of sliding components at least partially comprises a polymer, such as a fluoropolymer, such as a PTFE.

Embodiment 82

The method according to any one of embodiments 70-81, wherein all of the sliding components comprise a polymer, such as a fluoropolymer, such as a PTFE.

Embodiment 83

The method according to any one of embodiments 70-82, wherein at least one of the sliding components further comprises a substrate.

Embodiment 84

The method according to embodiment 83, wherein the substrate at least partially comprises a resilient material.

Embodiment 85

The method according to embodiments 83 and 84, wherein the substrate at least partially comprises a metal.

Embodiment 86

The method according to any one of embodiments 76-85, wherein the substrate at least partially comprises a polymer, such as a PA, a PE, a PP, a PET, a PBT, or any combination thereof.

Embodiment 87

The method according to any one of embodiments 70-86, wherein shaping the material is performed such that an interior surface of the generally annular body has a diameter less than an effective diameter of the sliding components.

Embodiment 88

A method of forming a bearing comprising:
shaping a material to form a generally annular body having cutouts along an interior surface, the cutouts each extending at least partially along an axial length of the generally annular body; and
engaging a plurality of sliding components in the cutouts, wherein the sliding components extend radially inward from the interior surface of the generally annular body.

Embodiment 89

The method according to embodiment 88, wherein engaging the plurality of sliding components in the cutouts is performed at least partially by molding the sliding components within the cutouts.

Embodiment 90

The method according to any one of embodiments 88 and 89, wherein engaging the plurality of sliding components in the cutouts is performed at least partially by translating each sliding component, translating the generally annular body, or a combination thereof.

Embodiment 91

The method according to any one of embodiments 88-90, wherein shaping the material is performed by bending.

Embodiment 92

The method according to any one of embodiments 88-91, wherein shaping the material is performed by injection molding.

Embodiment 93

The method according to any one of embodiments 88-92, wherein the material comprises a resilient material, such as a polymer, such as a PA, a PBT, a PPS, an ETFE, a PEEK, a PE, a PEI, a PESU, a PET, a PPA, a poly (p-phenylene sulfide), a PC, or any combination thereof.

Embodiment 94

The method according to any one of embodiments 88-93, wherein at least one of the sliding components at least partially comprises a low friction material.

Embodiment 95

The method according to any one of embodiments 89-94, wherein at least one of the sliding components at least partially comprises a polymer, such as a fluoropolymer, such as a PTFE.

Embodiment 96

The method according to any one of embodiments 88-95, wherein engaging the plurality of sliding components is performed such that the sliding components form an effective diameter, wherein the generally annular body has a diameter, as measured around an innermost surface thereof, and wherein the effective diameter is no greater than 90% the innermost diameter, such as no greater than 80%, no greater than 70%, no greater than 60%, no greater than 50%, no greater than 40%, or even no greater than 30%. Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A bearing comprising:
a first component having a body defining a first and a second opposite axial ends and a lumen extending between the first and second opposite axial ends, the first component having a plurality of cutouts extending along at least a portion of an axial length thereof; and
a plurality of discrete second components each disposed at least partially within one of the cutouts, the second components extending radially from the generally cylindrical body of the first component, wherein at least one of the second components extends along at least 50% and no greater than 100% of the axial length of the first component, wherein at least one of the cutouts, when viewed along the axial length of the lumen, has a T-Shaped cross section, wherein at least one of the second components comprises a laminate structure comprising a substrate and a low friction material, wherein at least one of the second components comprises a complementary engagement component, and wherein the complementary engagement component of the second component adapted to form an interference fit with the cutout and secure the first and second components together.

2. The bearing according to claim 1, wherein the plurality of second components are spaced apart around a circumference of the annular substrate.

3. A head restraint assembly comprising:
a head restraint comprising a body and a first and second post extending from the body;
a first guide sleeve comprising a first bearing for receiving the first post; and
a second guide sleeve comprising a second bearing for receiving the second post,
wherein at least one of the first and second guide sleeves comprises a head restraint bearing in accordance with claim 1.

4. The bearing according to claim 1, wherein at least one of the second components comprises a unitary construction.

5. The bearing according to claim 1, wherein the second component is removable from the first component.

6. The bearing according to claim 1, wherein at least one of the second components is visible along at least one axial ends of the first component.

7. The bearing according to claim 1, wherein at least one of the second components has at least one tapered axial end.

8. The bearing according to claim 1, wherein, when viewed along the axial length of the lumen, at least one of the cutouts has a throttled opening.

9. The bearing according to claim 1, wherein an interior surface of the first component is exposed between the cutouts.

10. A head restraint assembly comprising:
a head restraint comprising a body and a first and second post extending from the body;
a first guide sleeve comprising a first bearing for receiving the first post; and
a second guide sleeve comprising a second bearing for receiving the second post,
wherein at least one of the first and second guide sleeves comprises a head restraint bearing in accordance with claim 1.

11. A method of forming a bearing comprising:
shaping a material to form a generally annular body having cutouts along an interior surface, the cutouts each extending at least partially along an axial length of the generally annular body; and
engaging a plurality of discrete sliding components in the cutouts,
wherein the sliding components extend radially inward from the interior surface of the generally annular body, wherein at least one of the sliding components extends along at least 50% and no greater that 100% of the axial length of the annular body, wherein at least one of the cutouts, when viewed along the axial length of the annular body, has a T-Shaped cross section, wherein at least one of the sliding components comprises a laminate structure comprising a substrate and a low friction material, wherein at least one of the sliding components comprises a complementary engagement component, and wherein the complementary engagement component of the sliding component is adapted to form an interference fit with the cutout and secure the annular body and the sliding component together.

12. The method according to claim 11, wherein engaging the plurality of sliding components in the cutouts is performed at least partially by molding the sliding components within the cutouts.

13. The method according to claim 11, wherein engaging the plurality of sliding components in the cutouts is performed at least partially by translating each sliding component, translating the generally annular body, or a combination thereof.

14. The method according to claim 11, wherein shaping the material is performed by bending, injection molding, or a combination thereof.

* * * * *

UNITED STATES PATENT AND TRADEMARK OFFICE
CERTIFICATE OF CORRECTION

PATENT NO. : 9,776,540 B2
APPLICATION NO. : 14/974686
DATED : October 3, 2017
INVENTOR(S) : Oliver Otto It is certified that error appears in the above-identified patent and that said Letters Patent is hereby corrected as shown below:

On the Title Page

Page 2, Column 2, item (56) under FOREIGN PATENT DOCUMENTS, please delete reference "EP 2010058306 A1 5/2010" and insert reference --WO 2010058306 A1 5/2010--.

Signed and Sealed this
Thirteenth Day of March, 2018

Andrei Iancu
*Director of the United States Patent and Trademark Office*